July 4, 1950          E. C. HART          2,513,862
AUTOMATIC SHUTOFF VALVE
Filed July 1, 1947          2 Sheets—Sheet 1
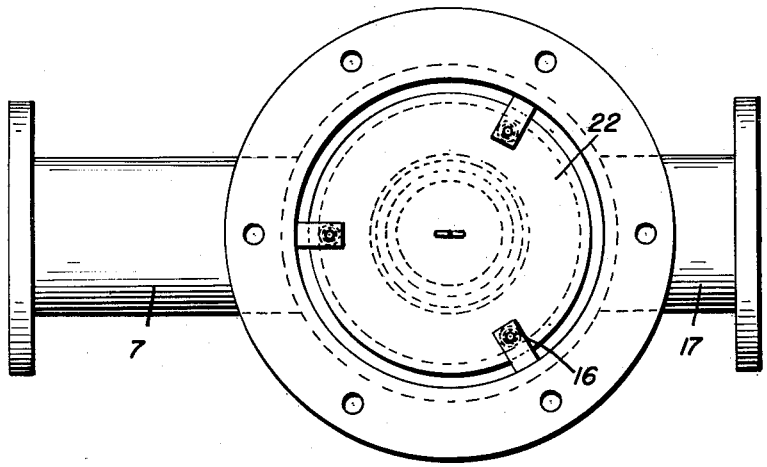
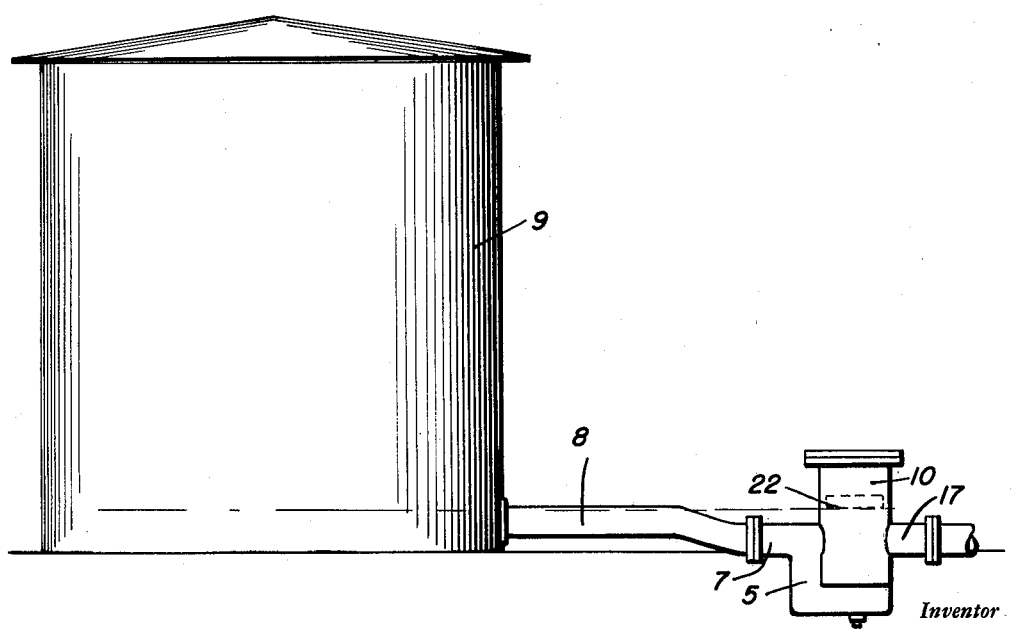
Inventor
Ewing C. Hart
By *Clarence A. O'Brien and Harvey B. Jacobson*
Attorneys July 4, 1950 E. C. HART 2,513,862
AUTOMATIC SHUTOFF VALVE
Filed July 1, 1947 2 Sheets-Sheet 2
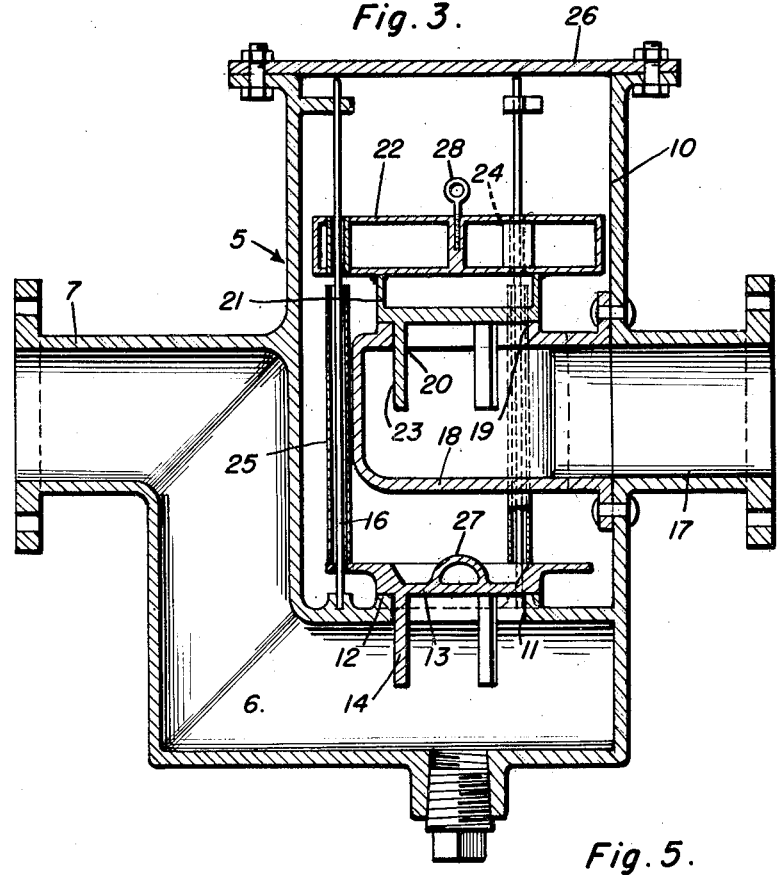
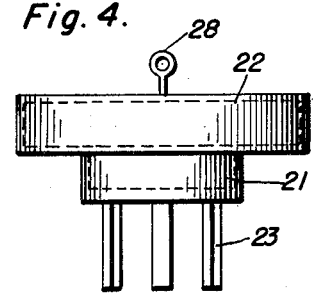
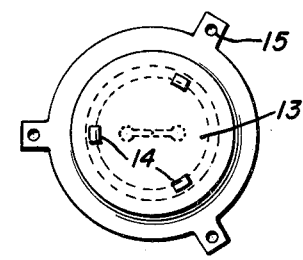
Inventor
Ewing C. Hart
By *Clarence A. O'Brien and Harvey B. Jacobson*
Attorneys Patented July 4, 1950

2,513,862

UNITED STATES PATENT OFFICE 2,513,862

AUTOMATIC SHUTOFF VALVE

Ewing C. Hart, Russell, Kans., assignor of forty per cent to James E. Chastain, Russell, Kans.

Application July 1, 1947, Serial No. 758,290

3 Claims. (Cl. 277—42)

The present invention relates to new and useful improvements in automatic shut-off valves for use on gravity systems of pipe lines leading from oil storage tanks and for other purposes.

An important object of the present invention is to provide an automatic shut-off valve which prevents air from entering the pipe line after the oil in a storage tank has fallen to and below the header line level of the discharge pipe from such tank and to also prevent the return of the oil in the tank from the discharge pipe.

A still further object is to provide an automatic shut-off valve which prevents air locks in pipe lines and pumping units especially between a storage tank and the force pump connected thereto.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the valve in its connected relation with a storage tank;

Figure 2 is an enlarged top plan view of the valve housing;

Figure 3 is a vertical sectional view;

Figure 4 is a side elevational view of the float valve;

Figure 5 is a bottom plan view of the lower valve for the inlet chamber.

Referring now to the drawings in detail wherein for the purpose of illustration I have disclosed a preferred embodiment of the invention the numeral 5 designates the valve housing generally and which includes an inlet chamber 6 having a flanged inlet pipe 7 connected to its upper portion and to which a discharge pipe 8 leading from a storage tank 9 is connected, the chamber 6 preferably being below the horizontal plane of the pipe 8 whereby oil will flow from the tank 9 by gravity to the inlet chamber 6.

A float chamber 10 is integrally cast with the housing 5 and projects upwardly from the inlet chamber 6. The bottom of the float chamber 10 is provided with an opening 11 for admitting liquid thereto from the chamber 6.

The opening 11 is provided with a valve seat 12 on which a gravity actuated valve 13 is engaged, the valve 13 having legs 14 extending downwardly in to the opening 11 to guide the valve into its closed position on the seat 12.

Apertured tongues 15 project radially from the valve 13 for sliding the valve 13 on vertical guide rods 16 suitably supported in the float chamber 10.

A flanged discharge pipe 17 projects horizontally from the float chamber 10 in the plane of the inlet pipe 7. A header 18 is attached to the inner end of the discharge pipe 17 and projects into the float chamber 10, the header 18 being provided with an opening 19 in its top and formed with a valve seat 20 at the edge of the opening. A float valve 21 is integrally formed at the bottom of a float 22, the valve 21 being seated on the seat 20 to close the opening 19 and legs 23 extend downwardly from the valve through the opening 19 to guide the valve into its seated position.

The float 22 is provided with vertical openings 24 for sliding on the guide rods 16 and each of the guide rods between the valve 13 and float 22 is provided with a tube 25 slidably mounted on the guide rod.

The top of the float chamber 10 is closed by a cover plate 26.

A finger gripping lift 27 is provided for the valve 13 and a similar lift 28 is provided for the float 22 and the valve 21 attached thereto.

In the operation of the device oil flows by gravity from the storage tank 9 into the inlet chamber 6, sufficient pressure being built up in the chamber 6 to open the valve 13. The upper movement of the valve 13 pushes the tube 25 upwardly to engage the bottom of the float 22 to thereby raise the float and open the valve 21 and as oil enters the float chamber 10 the float 22 is maintained in its raised position.

The oil then passes from the float chamber 10 through opening 19 and out of discharge pipe 17 to a refinery or other point of disposal.

The level of oil in float chamber 10 drops when tank 9 is drained to the level of header 18 thus lowering float 22 and closing valve 21. Valve 13 is also closed when relieved of pressure in chamber 6 and air is prevented from entering float chamber 10 and inlet chamber 6 by way of the pipe 17. The valve 13 also prevents the return of oil to tank 9 from pipe 17.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An automatic cut-off valve for discharge pipes of tanks and comprising a valve housing having an inlet connection, a float chamber in the upper portion of the housing and having an outlet connection, said chamber having an opening in its bottom, a gravity actuated valve for the opening, a float valve for said outlet connection, and an operating connection between the valves for opening the float valve upon opening movement of the gravity-actuated valve.

2. An automatic cut-off valve for discharge pipes of tanks and comprising a valve housing having an inlet connection, a float chamber in the upper portion of the housing and having an outlet connection, said chamber having an opening in its bottom, a gravity actuated valve for the opening, responsive to fluid pressure entering the valve housing from the inlet to open the valve, a header in the float chamber for the outlet connection and having a discharge opening, a float valve in the float chamber for said discharge opening, and an operating connection between the valves for opening the float valve upon an opening movement of the gravity valve.

3. An automatic cut-off valve for discharge pipes of tanks and comprising a valve housing having an inlet connection, a float chamber in the upper portion of the housing and having an outlet connection, said chamber having an opening in its bottom, a gravity actuated valve for the opening, responsive to fluid pressure entering the valve housing from the inlet to open the valve, a header in the float chamber for the outlet connection and having a discharge opening, a float valve in the float chamber for said discharge opening, guide rods for the valves, and tubes slidable on the rods between the valves and operable to open the float valve upon an opening movement of the gravity valve.

EWING C. HART.

REFERENCES CITED

The following references are of record in the file of this patent:

UNITED STATES PATENTS

| Number | Name | Date |
| --- | --- | --- |
| 669,611 | Anderson | Mar. 12, 1901 |
| 1,906,277 | McGee | May 2, 1933 |